July 10, 1923.
M. T. BARRIER
1,461,107
STAKE HOLDING DEVICE FOR TRUCKS, TRAILERS, AND THE LIKE
Filed Sept. 9, 1921
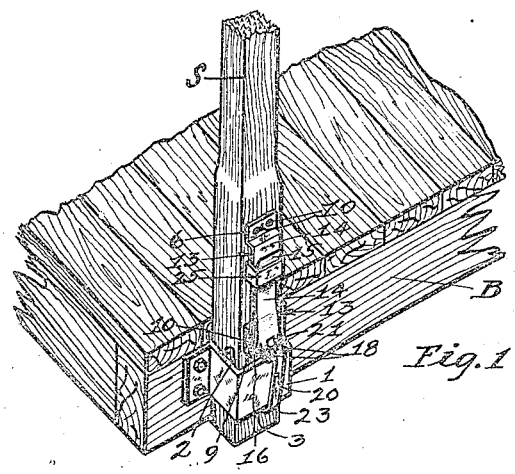

Patented July 10, 1923.

1,461,107

UNITED STATES PATENT OFFICE.

MICHAEL T. BARRIER, OF LANCASTER, CALIFORNIA.

STAKE-HOLDING DEVICE FOR TRUCKS, TRAILERS, AND THE LIKE.

Application filed September 9, 1921. Serial No. 499,583.

*To all whom it may concern:*

Be it known that I, MICHAEL T. BARRIER, a citizen of the United States, and a resident of Lancaster, in the county of Los Angeles and State of California, have invented new and useful Improvements in Stake-Holding Devices for Trucks, Trailers, and the like, of which the following is a specification.

This invention relates to and has for a principal object the provision of means for effectively holding stakes in position on trucks, trailers, and the like, and adapted for ready and easy manipulation for removing the stakes from position, and attaching them in position on the bodies of the trucks and trailers.

A preferred embodiment of my invention, subject to modification within the scope of the appended claims, is shown in the accompanying drawings, in which:

Fig. 1 is a fragmentary perspective view of a portion of a truck bed, showing a stake held in position thereon by means of my device.

Fig. 2 is a perspective view of the attaching and detaching member; and Fig. 3 is a perspective view of the thick support for said attaching and detaching member.

In said drawings, B represents the bed of a truck, which is usually provided on the sides with a plurality of right-angularly bent metal socket members 1, having a rectangular opening 2 therein adjacent the sides of the bed, and adapted to receive the lower portions 3 of the stakes S, the weight of the stakes having heretofore been thought sufficient to hold the stakes in position in the sockets, and the lower ends of said stakes being tapered so as to frictionally engage the socket members 1.

I have found, however, that in the use of devices of this character the vibration set up on the bed of the vehicle, due to the movement thereof over rough roads usually causes the stakes to become loosened in the socket members, and frequently to such an extent as to be lost.

In order to overcome this difficulty and to insure the stakes being permanently held in the socket members, I have provided a device attachable to the outer side of each of the stakes whereby the stakes may be positively held in position in the socket members and readily detached therefrom at will.

Said holding device includes a stationary supporting bracket 4, formed of flat material and having a central elongated portion 5, bent outwardly from feet 6 and 7 at the outer ends respectively, and a hinge loop 8 bent upwardly from the feet 7 of said brackets and adapted to receive a hinge pin 9.

The bracket 4 is held on the sides of the stakes S by means of screws 10, 10, etc., which are inserted through perforations 11, 11, formed in the feet 6 and 7, and the hinge pin 9 is preferably held stationary in the hinge loop 8 on the bracket by means of a pin 12. An operating member 13, which is formed of material similar to the bracket 4, has a flat extension 14 corresponding in width to the portion 5 of the supporting bracket, and the outer end 15 thereof is slightly bent upwardly, while the opposite end of said member has a pair of downwardly bent hinge loops 16, 16, and a pair of upwardly bent portions 17, 17, intermediate the loops 16, 16, which terminate in hinge loops 18, 18 substantially above the plane of the portion 14 of the operating member.

The loops 16, 16 of member 13 are adapted to receive the extended ends of the hinge pin 9 held in the loop 8 of the bracket 4, and the portions 17, 17 of member 13 are spaced apart so as to straddle the loop 8 on said bracket.

The hinge loops 18, 18 of member 13 are adapted to receive a hinge pin 19, and a latch member 20 has a loop 21 at its inner end which encompasses the inner portion of the pin 19 and is attached thereto by means of a retaining pin 22. The outer end of the latch member 20 is provided with a hook 23 which has a beveled edge 24 adapted to grip the lower portion of the socket member 1, and to extend slightly upwardly on the inside of said members in contact with the stakes S.

The bracket 4 carries a slip sleeve 25 of rectangular cross section which is slidably held on the portion 5 of said bracket and is adapted to slip over the end portion 15 of member 13 for holding the device and the stake carrying the device locked in the position shown in Fig. 1. The upwardly bent end 15 of member 13 will thus serve to retain the sleeve 25 in locked position, but inasmuch as the portion 14 of member 13 is substantially spaced from the portion 5 of bracket 4, the end 15 of member 13 may be sprung downwardly so as to permit the sleeve 25 to be removed therefrom when it is desired to detach a stake from normal position on the bed.

Now, it will be observed that the device shown and described is of such design as to in effect comprise a compound hinge of off-set character, the operating member 13 being pivoted on the stationary bracket 4, and the latch 20 being pivoted on the operating member 13 and having its fulcrum substantially spaced from the fulcrum of the member 13. Thus, when the member 14 is pressed downwardly into closely spaced relation with the bracket 5 of the member 4, the latch 20 will firmly grip the lower edge of the socket member 1 and may be held in such position by the sleeve 25 being moved over the free end 15 of member 13.

Reversely, when the sleeve 25 is released from the member 13, the portion 14 of said member may be raised upwardly from the portion 5 of the bracket 4 so as to swing the hinge connection between said member and the latch 20, outwardly for releasing the hub 23 of said latch from the socket member.

It will be observed that I have provided a simple and effective device for the purpose described, and I do not desire to limit myself to the exact form of structure or relation of parts shown.

What I claim is:

1. A stake holding device for trucks and the like, comprising in combination with sockets for receiving said stakes, a stationary bracket attached to each of said stakes and having a portion thereof spaced from the stake, an operating member hinged to one end of said bracket, an off-set latch member hinged at one end to said operating member and formed at its other end for gripping the edge of said socket member for holding the stakes in position, and a sleeve for holding said member in locked position.

2. A stake holding device for trucks and the like, comprising in combination with sockets for receiving said stakes, a stationary bracket attached to each of said stakes and having a portion thereof spaced from the stake, an operating member hinged to one end of said bracket, and an off-set latch member hinged at one end of said operating member and formed at its other end for gripping the edge of said socket member for holding the stakes in position, and means loosely held on said stationary member for engagement with said operating member for retaining said latch in locked position.

3. In a device of the character described, a socket member, a stake insertable therein, a stationary bracket attached to said stake and having a portion thereof spaced from said stake, an operating member hingedly secured to said stationary member and having other hinge portions substantially spaced therefrom, a latch member hingedly connected to said operating member on said hinge portions and having its free end adapted to engage one edge of said socket member, and means carried on said stationary member for engagement with said operating member for holding said latch in locked position.

4. A device of the character described embodying stationary and movable members hinged together, a latch hingedly connected to said movable member at a point substantially spaced from said other hinge connection, a stationary socket member, said latch being adapted to engage said socket member, and means for locking said movable member and said latch member, for the purpose described.

5. A device of the character described embodying a stationary support, an operating member hinged thereto, a latched member hingedly to said operating member at a point substantially spaced from said stationary member, a sleeve slidably held on said stationary member and adapted to encompass a portion of said operating member for holding said latch in closed position.

MICHAEL T. BARRIER.

Witnesses:
CHAS. BAGG,
IRENE BREEN.